No. 880,144. PATENTED FEB. 25, 1908.
O. J. JOHNSON.
RUNWAY OR CHUTE FOR CAN END SOLDERING MACHINES.
APPLICATION FILED JAN. 16, 1906. RENEWED JULY 31, 1907.

Witnesses:
E. A. Volk.
R. W. Rumsor.

Inventor.
Oliver J. Johnson,
By Wilhelm, Parker & Hard,
Attorneys.

UNITED STATES PATENT OFFICE.

OLIVER J. JOHNSON, OF WHEELING, WEST VIRGINIA.

RUNWAY OR CHUTE FOR CAN-END-SOLDERING MACHINES.

No. 880,144. Specification of Letters Patent. Patented Feb. 25, 1908.

Application filed January 16, 1906, Serial No. 296,272. Renewed July 31, 1907. Serial No. 386,361.

*To all whom it may concern:*

Be it known that I, OLIVER J. JOHNSON, a citizen of the United States, residing at Wheeling, in the county of Ohio and State of West Virginia, have invented a new and useful Improvement in Runways or Chutes for Can-End-Soldering Machines, of which the following is a specification.

This invention relates to can runways or chutes for can end soldering machines of that kind, known as "floaters", in which the cans are rolled in an inclined position along a horizontal soldering track with the circular edge of one end of the cans dipping into a bath of molten solder, and then pass down a runway or chute to a solder saver which removes the superfluous solder from the cans. The solder saver is ordinarily located at the side of the machine below the soldering track to save floor space and the cans are conveyed through it in a direction opposite to their direction of movement on the soldering track. The runway between the soldering track and solder saver is constructed to effect the necessary change of direction of movement of the cans to deliver them to the conveyer of the solder saver in the direction in which this conveyer moves without stopping, and to turn the cans into an upright position with the ends just soldered down so that the solder will settle evenly into the joints to insure a perfect connection while the cans are passing through the solder saver and cooling. A runway of this character is disclosed in the patent granted to Livingston, No. 492,034, dated Feb. 21, 1893. The runway, as usually constructed, is curved or looped to change the direction of movement of the cans from that on the soldering track to that through the solder saver and is also twisted to cause the cans to turn into upright position, so that the cans have a combined rolling, sliding and twisting motion while passing through the runway. As the solder is still hot and soft while the cans are in the runway, the twisting of the cans while sliding on their ends, or any jarring of the cans is liable to disturb the ends and produce leaky joints.

The object of the invention is to improve the construction of these runways or chutes to insure a smoother, freer movement of the cans and avoid any twisting or jarring thereof while passing through the runways which could dislodge or disturb the newly soldered ends and produce defective or leaky joints.

Figure 1:
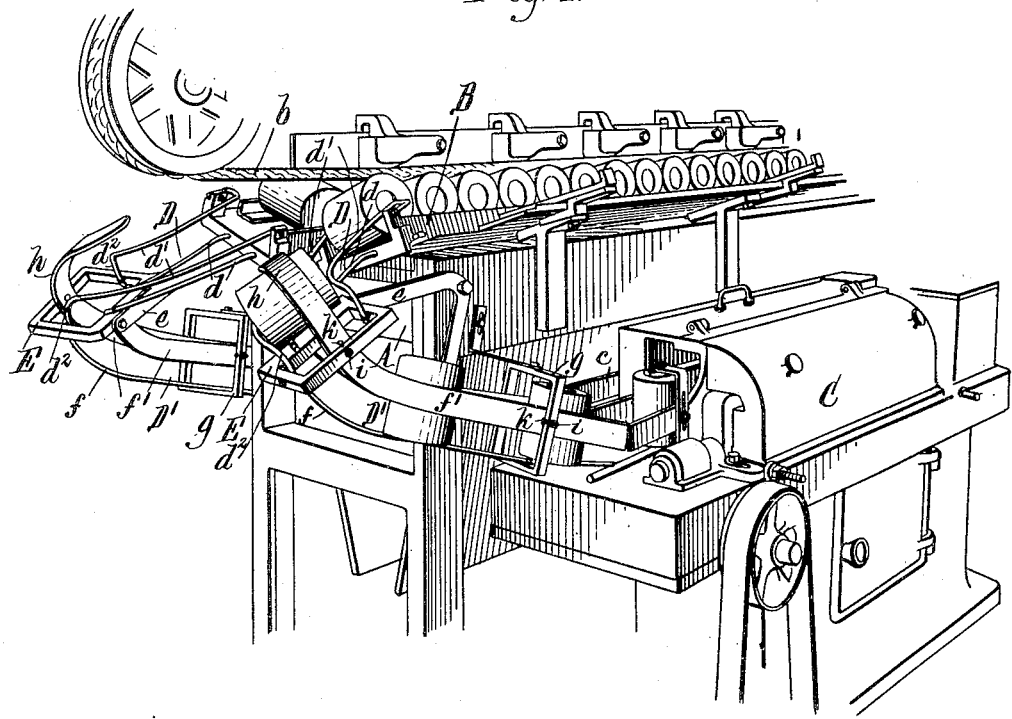
Figure 2:
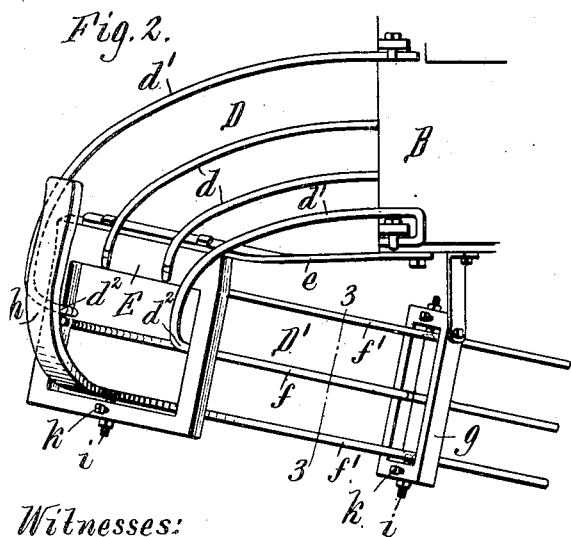
Figure 3:
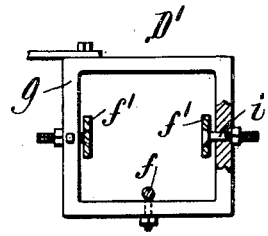

In the accompanying drawings, consisting of one sheet: Figure 1 is a perspective view of one end of a can end soldering machine provided with runways or chutes embodying the invention. Fig. 2 is a plan view of one of the runways. Fig. 3 is a cross section thereof substantially in line 3—3, Fig. 2.

Like letters of reference refer to like parts in the several figures.

A portion of a can end soldering machine or "floater" is shown in Fig. 1 of the drawings.

A represents a portion of the solder box or receptacle for the molten solder bath, B the horizontal, transversely inclined soldering track along which the cans are rolled by the chain $b$ with the circular edge of one end dipping in the solder, and C the solder saver or device through which the cans are carried by a conveyer $c$ and which removes the superfluous solder from the cans. These parts are all of well known construction and operation.

The runway or chute connecting the rear or discharge end of the soldering track with the solder saver consists essentially of an upper portion D which joins the end of the soldering track and forms a curved and downwardly inclined continuation thereof, and a downwardly inclined substantially straight lower portion $D^1$ which leads to the conveyer of the solder saver or other conveyer for the cans with its discharge or tail end extending in substantially the direction of movement of such conveyer. Neither portion of the runway is twisted or constructed to twist the cans into the upright position while sliding thereon, but the parts are so formed that the can rolls on its side throughout the length of the upper portion of the runway and slides on one end without twisting throughout the length of the lower portion of the runway.

In the construction illustrated in the drawings, each portion D $D^1$ of the runway or chute has a bottom and sides composed of substantially parallel wires, rods or strips connected by suitable open frames, for holding them in position. The bottom wires or strips $d$ and the side wires or strips $d^1$ of the upper portion of the runway or chute are attached at their upper ends respectively to the ends of the bottom and sides of the soldering track, and all of the wires or strips extend from the soldering track at a downward inclination and in a curve, making substantially a quarter turn from the direction of the soldering track. The outer or rear ends of the bottom wires or strips $d$ are attached to the inner side of an inclined open or rectangular frame E, and the ends $d^2$ of the side wires $d^1$ are bent downwardly and attached one to the top and the other to the bottom of the frame E. This frame E is supported in any suitable way, for instance, by a bracket $e$ projecting from the frame of the soldering machine, and has substantially the same inclination as the transverse inclination of the bottom of the upper portion of the runway. The lower portion of the runway is composed of a bottom wire rod or strip $f$ and side rods or strips $f^1$ secured at their upper ends to the frame E and below this frame to a similar open or rectangular frame $g$, which, like the frame E, is preferably supported by a bracket projecting from the frame of the soldering machine. The bottom wire, rod or strip of the lower portion of the runway is virtually a continuation of the inner side strip of the upper portion of the chute or runway and could be formed by an integral prolongation thereof, and similarly the bottom strips of the upper portion of the runway could be continued to form the inner side of the lower portion of the runway. The upper end of the strip at the outer side of the lower portion of the runway is curved inwardly and upwardly at $h$ over the open frame E toward the upper portion of the runway, the curve being such as to guide the cams, without jarring them, through the open frame E into the lower portion of the runway, and the lower portion of the runway is curved downwardly from the frame E instead of being a simple straight incline so that the cans will slide smoothly and without a sudden jar or shock into the lower portion of the runway. The lower portion of the runway is, as explained, curved or concaved downwardly but not twisted or curved laterally.

The chute or runway constructed of the wires, rods or strips arranged and shaped as described and shown in the drawings gives excellent results and insures a very rapid, free and smooth movement of the cans therethrough without twisting or jarring, and this construction is therefore deemed preferable, but the sides and bottom of the runway or chute could be differently constructed without departing from essential characteristics of the runway as a whole.

The outer side strip $f^1$ of the lower portion of the runway is preferably adjustable in and out to suit cans of different diameters. Any suitable adjusting means could be used. As shown, the strip is provided with attaching stems $i$ which are adjustably secured in holes in the frames E and $g$ by set screws $k$.

In the operation of the soldering machine the cans are rolled along the soldering track by the chain $b$ into the head end of the upper portion of the runway or chute and they roll by gravity down this upper portion of the runway on account of its inclination. As the upper portion of the runway is inclined transversely at substantially the same angle as the soldering track and makes nearly a quarter turn, each can will be thereby turned through a considerable part of a circle by the time it reaches the open frame E, that is with its length extending lengthwise instead of crosswise with respect to the soldering track. As the can rolls off of the upper portion of the chute it will pass through the frame E in its inclined position and slide on its lower end on the bottom of the lower portion of the chute or runway, passing from the same into the solder saver in a substantially upright position. The can simply rolls on its side in the upper portion of the runway and slides on its lower end in the lower portion thereof, thus partaking in two distinct movements and not being twisted in either portion of the runway to turn it into the upright position. As is well known, after the cans pass through the solder saver at one side of the machine they are returned to the soldering track at the opposite side of the machine to solder their other ends and pass from this second soldering track through a runway similar to that described to the second solder saver. Two runways are therefore employed with each machine but as the runways are similar in construction, only being oppositely arranged, the description of one will be sufficient for both.

I claim as my invention:

1. A can runway or chute for soldering machines, comprising a downwardly and laterally inclined and curved upper portion, and a lower portion which inclines downwardly from the end of said curved upper portion and is substantially straight laterally, substantially as set forth.

2. A can runway or chute for soldering machines, comprising a downwardly and laterally inclined upper portion which is curved laterally, and a downwardly curved lower portion which inclines downwardly without substantial lateral change of direction from the end of said curved upper portion, substantially as set forth.

3. A can runway or chute for soldering machines, comprising a downwardly and laterally inclined and curved upper portion, and a laterally straight lower portion which inclines downwardly from the end of said upper portion, each of said portions being composed of bottom and side strips, substantially as set forth.

4. A can runway or chute for soldering machines, comprising a laterally inclined and curved upper portion, and a lower portion which is substantially straight laterally and inclines downwardly and at an abrupt angle from the end of said upper portion, substantially as set forth.

5. A can runway or chute, comprising a downwardly and laterally inclined and curved upper portion, a substantially laterally straight and inclined lower portion, and an open frame joining said upper and lower portions, substantially as set forth.

6. A can runway or chute, comprising a downwardly and laterally inclined and curved upper portion, a substantially laterally straight and inclined lower portion, an open frame joining said upper and lower portions, and a curved guide projecting up from said lower portion over said frame, substantially as set forth.

7. A can runway or chute for soldering machines, comprising a downwardly and laterally inclined and curved upper portion, a laterally straight lower portion which inclines downwardly from the end of said upper portion, each of said portions being composed of bottom and side strips, and means for adjusting one side strip of the lower portion, substantially as set forth.

Witness my hand, this 10th day of January, 1906.

OLIVER J. JOHNSON.

Witnesses:
C. E. CLOVIS,
NEWTON WATTZ.